(12) United States Patent  (10) Patent No.: US 8,502,851 B2
Koga  (45) Date of Patent: Aug. 6, 2013

(54) OPTICAL SCANNING APPARATUS AND TECHNIQUE FOR CORRECTING OPTICAL CHARACTERISTICS IN AN IMAGE FORMING APPARATUS THAT EMPLOYS AN ELECTROSTATIC RECORDING METHOD OR AN ELECTROPHOTOGRAPHIC RECORDING METHOD

(75) Inventor: Katsuhide Koga, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/158,225

(22) Filed: Jun. 10, 2011

(65) Prior Publication Data

US 2011/0236047 A1 Sep. 29, 2011

Related U.S. Application Data

(63) Continuation of application No. 11/949,580, filed on Dec. 3, 2007, now Pat. No. 7,982,760.

(30) Foreign Application Priority Data

Dec. 19, 2006 (JP) .................................. 2006-341126

(51) Int. Cl.
*B41J 2/435* (2006.01)
(52) U.S. Cl.
USPC .......................................... 347/236; 347/246

(58) Field of Classification Search
USPC ................................... 347/236, 237, 246, 247
See application file for complete search history.

(56) References Cited

U.S. PATENT DOCUMENTS 6,795,099 B2 * 9/2004 Koga et al. ..................... 347/129
7,446,793 B2 * 11/2008 Inagawa et al. ................ 347/236

FOREIGN PATENT DOCUMENTS

| JP | 2003-087508 A | 3/2003 |
| JP | 2005-262478 A | 9/2005 |
| JP | 2005-262485 A | 9/2005 |
| JP | 2006-069118 A | 3/2006 |

* cited by examiner

*Primary Examiner* — Hai C Pham
(74) *Attorney, Agent, or Firm* — Canon USA Inc IP Division

(57) ABSTRACT

An optical scanning apparatus controls an output of a light source for forming an electrostatic latent image on an image carrier. The optical scanning apparatus includes a correction amount control unit configured to variably control a light quantity correction amount of the light source according to a scanning position on the image carrier during one scanning operation with a beam generated from the light source, an output signal level changing unit configured to change a level of an output signal from the correction amount control unit, and a light quantity control unit configured to control a light quantity of the light source according to the scanning position based on a signal from the output signal level changing unit.

14 Claims, 12 Drawing Sheets

OPTICAL SCANNING APPARATUS AND TECHNIQUE FOR CORRECTING OPTICAL CHARACTERISTICS IN AN IMAGE FORMING APPARATUS THAT EMPLOYS AN ELECTROSTATIC RECORDING METHOD OR AN ELECTROPHOTOGRAPHIC RECORDING METHOD

CROSS REFERENCE TO RELATED APPLICATIONS

The present application is a continuation of U.S. patent application Ser. No. 11/949,580, filed Dec. 3, 2007, entitled "OPTICAL SCANNING APPARATUS AND TECHNIQUE FOR CORRECTING OPTICAL CHARACTERISTICS IN AN IMAGE FORMING APPARATUS THAT EMPLOYS AN ELECTROSTATIC RECORDING METHOD OR AN ELECTROPHOTOGRAPHIC RECORDING METHOD", the content of which is expressly incorporated by reference herein in its entirety. Further, the present application claims priority from Japanese Patent Application No. 2006-341126 filed Dec. 19, 2006, which is hereby incorporated by reference herein in its entirety.

BACKGROUND OF THE INVENTION

1. Field of the Invention

The present invention relates to a technique for correcting optical characteristics in an image forming apparatus that employs an electrostatic recording method or an electrophotographic recording method.

2. Description of the Related Art

A conventional optical scanning apparatus is, for example, employed in an image forming apparatus of an electrophotographic type and configured to hold a constant level of laser light quantity during one scanning operation. To this end, a conventional control operation includes detecting an output of the laser within a predetermined light detection period (i.e., a beam detection (BD) period) being set during one scanning operation and holding the driving current for the laser at a constant level during one scanning operation. This is generally referred to as auto power control (APC) processing. One scanning operation is a single scanning operation of a laser beam in a longitudinal direction (i.e., an axial direction) of a photosensitive member (i.e., an image carrier).

However, when one scanning operation of the laser beam is performed on a photosensitive member (i.e., an image carrier), the density of a reproduced image varies depending on a laser position during the scanning operation. The unevenness of density is particular when images are compared between the center and the edge of the photosensitive member.

In general, a luminous flux incident on a polygonal mirror of an optical scanning apparatus has a Gauss distribution such that the light intensity can be maximized in the vicinity of an optical axis of a collecting optical system. Therefore, a light reflection and deflection region changes from the vicinity of the optical axis toward the edge according to an angle of field (i.e., a scanning angle capable of assuring an effective writing width relative to a photosensitive member).

The illuminance on a photosensitive member (i.e., a surface to be scanned) tends to decrease at the edge compared to the center. Namely, the illuminance decreases according to an increase in the image height (i.e., the position on a photosensitive member). The image height is "0" at the center of the photosensitive member and has a plus or minus value when the position moves toward the edge. This phenomenon is hereinafter referred to as "light quantity falloff at edges."

In addition, due to an erroneous setup of a light source (such as a laser), the position where the intensity of an incident luminous flux is maximized on a deflection surface of a polygonal mirror may deviate from the center of an effective luminous flux width (relative to a main scanning direction of the deflection surface) toward an edge of the effective luminous flux width. In this case, in addition to light quantity falloff at edges, the illuminance on a scanned surface tends to increase or decrease when the position moves from one image height to another image height.

The illuminance along a scanning line on a photosensitive member (i.e., a surface to be scanned) may cause unevenness. Therefore, a formed image may have unevenness of density.

As discussed in Japanese Patent Application Laid-Open No. 2006-069118, in order to solve the above-described problem (i.e., to correct light quantity fall at edges), a conventional system divides one scanning period into a plurality of blocks and stores an amount of correction of light quantity falloff at edges (hereinafter referred to as "profile data") for each block. During one scanning operation, the system reads profile data of a target block and profile data of a neighboring block, and controls a driving current value of the laser using linearly interpolated profile data obtained from the read data to correct light quantity falloff at edges.

FIG. 12 illustrates a conventional correction circuit for correcting light quantity falloff at edges. The correction circuit includes a digital/analog (D/A) converter 602 and a low-pass filter 604.

The D/A converter 602 receives a sampled-and-held voltage value VSH (i.e., a voltage value corresponding to a maximum light quantity) as a reference voltage to perform APC processing in a light detection period (i.e., the BD period) during one scanning operation. The D/A converter 602 also receives light quantity correction data 203 from a light quantity correction unit (not illustrated) and a clock signal CLK. The D/A converter 602 performs digital/analog conversion processing on the voltage value VSH based on the light quantity correction data 203 and the clock signal CLK.

The low-pass filter 604 is, for example, composed of a capacitor and a resistor. The low-pass filter 604 can filter an analog signal S605 received from the D/A converter 602. The filter 604 outputs an analog signal VCOM (i.e., a filtered signal) that can be used to control the current of a pulse current source of a laser drive control unit (not illustrated). Thus, the correction circuit can variably control the quantity of light during one scanning operation and can correct light quantity falloff at edges.

However, the following problem arises when the above-described conventional circuit corrects the driving current of a laser according to an amount of correction of light quantity falloff at edges of an optical system to solve the unevenness of density of an image.

More specifically, even if the rate of light quantity falloff at edges is 10% or 20%, i.e., even if the light quantity deteriorates from 100% to 90% or 80% during one scanning operation, a dynamic range for the D/A conversion is set to the light quantity of 100% to 0%.

For example, the above-described dynamic range setting is required to realize the correction of light quantity falloff at edges for a low light quantity of approximately 50%. As 1LSB (i.e., a minimum resolution of D/A) is a value determined in relation to the 100% light quantity, the resolution deteriorates according to a decrease in the light quantity. To solve this problem, the D/A of a higher resolution is required.

Furthermore, re-calculation of correction data is required if there is any change in the light quantity to be used. Thus, the control becomes complicated.

The above-described problem is described in more detail with reference to FIGS. 11A and 11B. FIG. 11A illustrates a light quantity distribution on a drum surface including a BD image height (i.e., an image height at a BD position) at a light quantity level of $P_0$. In FIG. 11A. $P_{OBD}$ represents a light quantity at the BD image height, $P_{X0}$ represents a light quantity at an image height $X_0, \ldots$, and $P_{XN}$ represents a light quantity at an image height $X_N$. Furthermore, $(P_0-P_{X0})/P_{X0}, \ldots$, and $(P_0-P_{XN})/P_{XN}$ represent correction amounts $Y_0, \ldots$, and $Y_N$ at respective image heights $X_0 \ldots X_N$.

Namely, each of the correction amounts $Y_0, \ldots$, and $Y_N$ is a ratio of a difference between a target light quantity and an actual light quantity to the actual light quantity at each image height. The light quantity correction is performed by adding the correction amount to the laser driving current according to the image height, to have the target light quantity at each image height, as indicated by a corrected profile $P'_0$ in FIG. 11A. In this case, if a D/A converter has a resolution of 8 bits, the minimum resolution 1LSB becomes $P_0/255$. If the rate of light quantity falloff at edges at the light quantity level $P_0$ is 20%, the correction data is somewhere in a range of 0 to 51(=255×20%) at each image height.

FIG. 11B illustrates a comparative light quantity distribution on a drum surface at a light quantity level of $0.5P_0$ (i.e., a half of the light quantity $P_0$). In this case, the rate of light quantity falloff at edges is reduced to a half value. As illustrated in FIG. 11B, correction amounts $Y'_0, \ldots$, and $Y'_N$ corresponding to the light quantity level of $0.5P_0$ are $(0.5P_0-0.5P_{X0})/P_{X0}=0.5(P_0-P_{X0})/P_{X0}=0.5Y_0, \ldots$, and $(0.5P_0-0.5P_{XN})/P_{XN}=0.5 (P_0-P_{XN})/P_{XN}=0.5Y_N$ at respective image heights.

Namely, if the light quantity in the acquisition of profile data is different from the actually used light quantity, the same profile data cannot be used. For example, if the rate of light quantity falloff at edges is 20% and an 8-bit D/A converter is used at the light quantity level of $0.5P_0$, the correction data is somewhere in a range of 0 to 26 (=255×20% x50%) at each image height. The resolution deteriorates largely compared to the correction range from 0 to 51, even if the correction rate for the light quantity is the same (20%). The resolution further deteriorates according to a decrease in the light quantity.

SUMMARY OF THE INVENTION

Exemplary embodiments of the present invention are directed to an optical scanning apparatus capable of correcting light quantity falloff at edges at a higher correction resolution. The optical scanning apparatus can maintain a sufficient correction resolution even if there is any change in the light quantity, and does not require a re-calculation of correction data.

According to an aspect of the present invention, an optical scanning apparatus capable of controlling an output of a light source for forming an electrostatic latent image on an image carrier includes a correction amount control unit configured to variably control a light quantity correction amount of the light source according to a scanning position on the image carrier during one scanning operation with a beam generated from the light source, an output signal level changing unit configured to change a level of an output signal from the correction amount control unit, and a light quantity control unit configured to control alight quantity of the light source according to the scanning position based on a signal from the output signal level changing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain at least some of the principles of the invention.

DETAILED DESCRIPTION OF THE EMBODIMENTS

Figure 1:
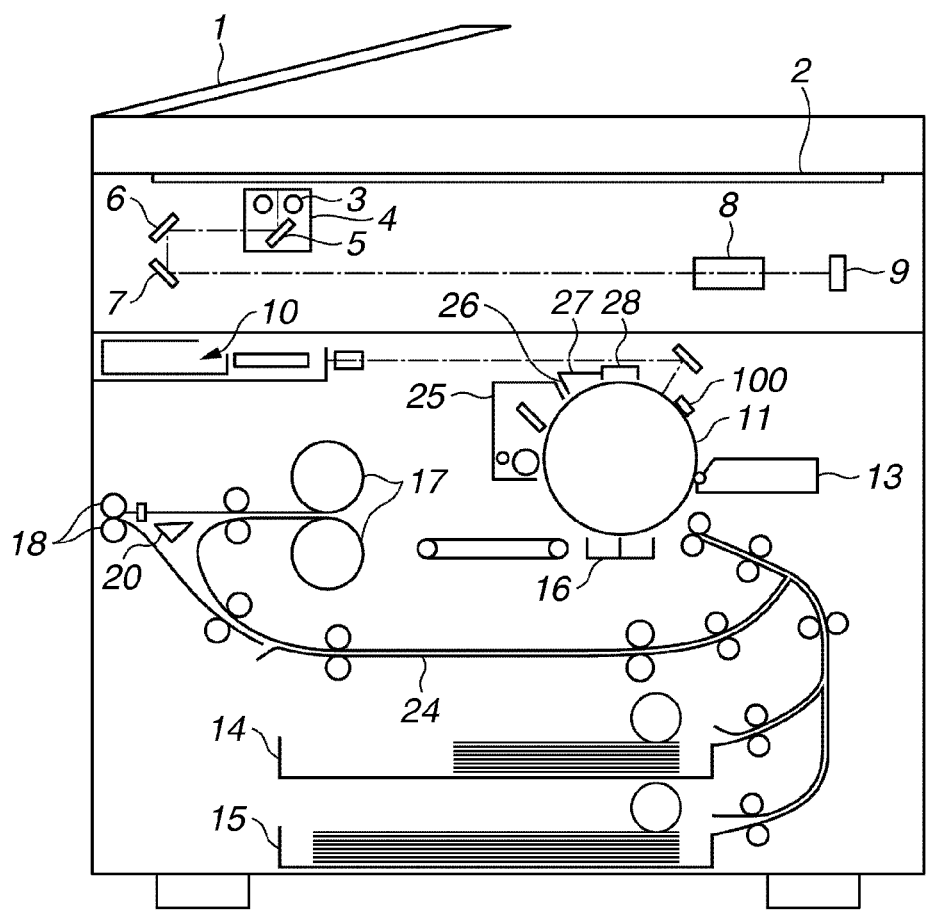
FIG. 1 is a cross-sectional diagram illustrating an image forming apparatus according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

FIG. 1 is a vertical cross-sectional diagram illustrating an image forming apparatus according to an exemplary embodiment of the present invention.

The image forming apparatus includes a document feeder 1 that successively conveys document sheets onto a document positioning glass plate 2. When a document sheet reaches a predetermined position on the document positioning glass plate 2, a lamp 3 turns on and a scanner unit 4 moves in a horizontal direction so that the entire surface of the laid document can be illuminated by the lamp 3. The reflection light from the document sheet sequentially reflects on mirrors 5, 6, and 7 and passes through a lens 8, and finally forms an optical image on an imaging surface of an image sensor unit 9.

The image sensor unit 9, having a photoelectric conversion function, converts the optical image into an electric signal. An image processing unit (not illustrated) receives the electric signal. The image processing unit converts the input electric signal into a digital signal and applies image processing to the digital signal. An image signal generated from the image processing unit is directly, or after temporarily stored in an image memory, sent to an exposure control unit 10 that functions as an optical scanning apparatus.

The exposure control unit 10 controls a light source, i.e., a semiconductor laser 43 (illustrated in FIG. 2), according to an input image signal. The semiconductor laser 43 emits a controlled laser beam, which is transmitted via a scanning system including a polygonal mirror 33 (see FIG. 2) onto a photosensitive drum 11 that functions as a rotary image carrier. The laser beam repetitively scans in the main scanning direction on the photosensitive drum 11.

Thus, an electrostatic latent image corresponding to the image signal can be formed on the photosensitive drum 11. An auxiliary charging device 26, a pre-exposure lamp 27, a primary charging device 28, a potential sensor 100, a developing device 13, a transfer device 16, and a cleaner 25 are disposed around the photosensitive drum 11.

The auxiliary charging device 26 has a function of preliminarily eliminating electrostatic charge on the surface of the photosensitive drum 11. The pre-exposure lamp 27 can remove residual charge from the surface of the photosensitive drum 11. The primary charging device 28 can uniformly charge the surface of the photosensitive drum 11. The potential sensor 100 measures an electric potential on the surface of the photosensitive drum 11. The potential sensor 100 is, for example, composed of six sensors positioned at equal intervals in the main scanning direction (i.e., in the axial direction of the photosensitive drum 11).

The developing device 13 supplies toner onto the surface of the photosensitive drum 11, so that an electrostatic latent image on the photosensitive drum 11 can be visualized as a toner image. The transfer device 16 transfers the toner image from the photosensitive drum 11 to a sheet having been fed from a cassette 14 or 15. The cleaner 25 removes residual toner from the photosensitive drum 11 and cleans the surface of the photosensitive drum 11 in preparation for the next image forming operation A sheet with a toner image transferred by the transfer device 16 is conveyed to a fixing unit 17. The fixing unit 17 thermally presses and fixes the toner image on the sheet. The sheet with the fixed toner image is guided by a flapper 20 toward discharge rollers 18, which discharge the sheet to the outside of the image forming apparatus.

In a two-sided print mode, after an image is formed on one surface of a sheet, the flapper 20 performs a switching operation for reversing the image forming surface to the other surface. According to this sheet reversing operation, the sheet is guided toward a two-sided path 24. Then, the sheet is conveyed from the two-sided path 24 to a space between the photosensitive drum 11 and the transfer device 16. Then, a toner image is transferred to the other surface of the sheet.

Figure 2:
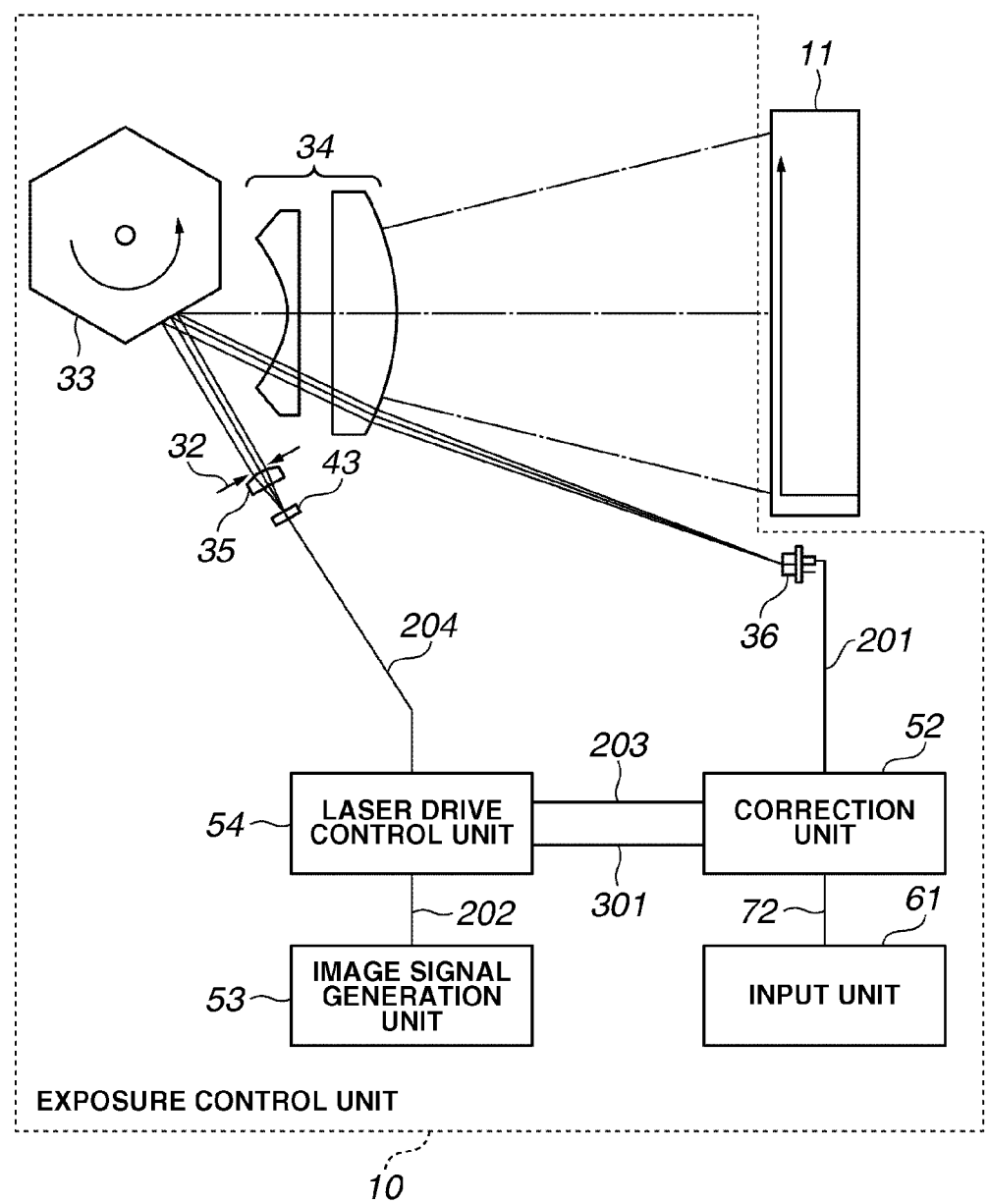
FIG. 2 illustrates an exposure control unit illustrated in FIG. 1 according to an exemplary embodiment of the present invention.

FIG. 2 illustrates an exemplary configuration of the exposure control unit 10. The exposure control unit 10 includes a laser drive control unit 54, which causes the semiconductor laser 43 to emit a laser beam. The semiconductor laser 43 includes a built-in photo diode (PD) sensor 43B (see FIG. 7) that can detect part of the emitted laser beam. A detection signal from the PD sensor 43B can be used for automatic power control (APC) of the semiconductor laser 43.

A collimator lens 35 and a diaphragm 32, associated together in a predetermined positional relationship, can convert a laser beam from the semiconductor laser 43 into a parallel beam that has a predetermined diameter, which reaches the polygonal mirror 33. The polygonal mirror 33 rotates at a constant angular speed in a direction indicated by an arrow in FIG. 2. In other words, the rotating polygonal mirror 33 can convert an incident laser beam into a deflecting beam that continuously changes the angle on a horizontal plane. The deflecting beam is subjected to a light collection function of an f-θ lens 34. The f-θ lens 34 corrects distortion of a laser beam to assure temporal scanning linearity. Thus, the laser beam can scan and form a latent image on the photosensitive drum 11 at a constant speed.

A beam detection (BD) sensor 36, which can detect a laser beam reflected from the polygonal mirror 33 and passing through the f-θ lens 34, is provided near an axial edge of the photosensitive drum 11. A detection signal 201 from the BD sensor 36 can be used as a synchronization signal for synchronizing the rotation of the polygonal mirror 33 with a writing operation of data.

An input unit 61 outputs light quantity correction data 72 to a correction unit 52. The input unit 61 is, for example, a bar-code reader that can read information from a bar code or an operation unit that enables a user to input various data. Alternatively, the input unit 61 can be any other device capable of inputting correction data, such as an electronically erasable and programmable read-only memory (EEPROM) that stores correction data for light quantity falloff at edges.

The correction unit 52 generates a BD mask signal 301 in synchronism with the BD signal 201 from the BD sensor 36 and outputs the generated BD mask signal 301 to the laser drive control unit 54. Furthermore, the correction unit 52 outputs the light quantity correction data 203 to the laser drive control unit 54 according to a scanning position of the laser beam on the photosensitive drum 11.

The laser drive control unit 54 has a D/A conversion function for converting the light quantity correction data 203 received from the correction unit 52 into an analog signal. During an image forming period for forming a latent image on the photosensitive drum 11, the laser drive control unit 54 controls a current value and a drive time of a driving (light emission) signal 204 for the semiconductor laser 43 based on an image signal 202 received from an image signal generation unit 53 and the light quantity correction data 203.

In this manner, the laser beam emitted from the semiconductor laser 43 becomes a parallel beam having a predetermined diameter via the collimator lens 35 and the diaphragm 32 and falls on the polygonal mirror 33.

Figure 3:
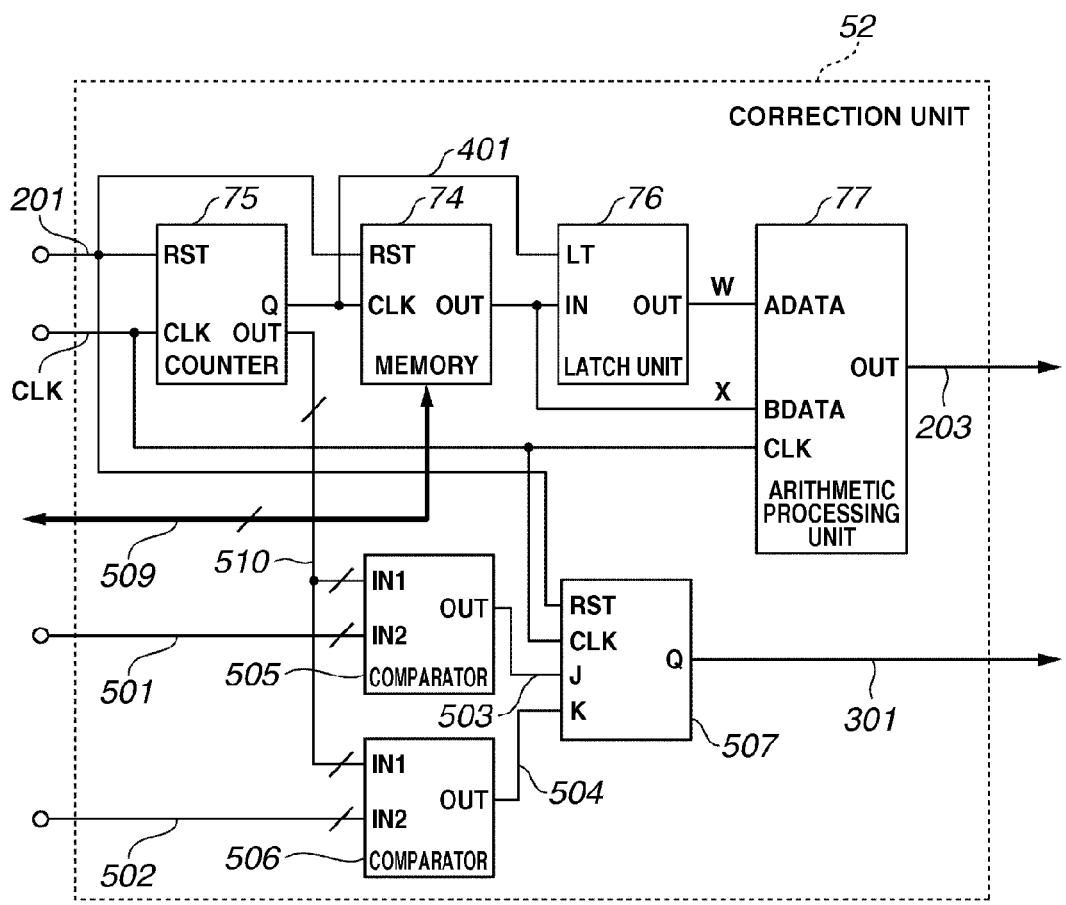
FIG. 3 illustrates a correction unit according to an exemplary embodiment of the present invention.

FIG. 3 is an exemplary circuit diagram of the correction unit 52 according to an exemplary embodiment of the present invention.

The correction unit 52 includes a memory 74, a counter 75, a latch unit 76, an arithmetic processing unit 77, a comparator 505, a comparator 506, and a JK flip-flop 507.

Figure 4A:
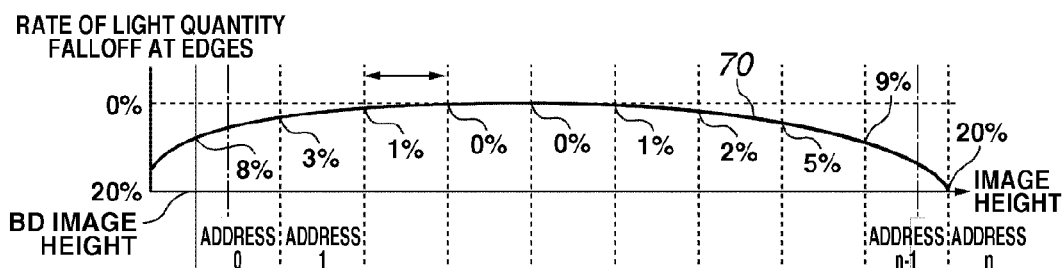
FIGS. 4A to 4C illustrate correction processing performed by the correction unit of the exposure control unit according to an exemplary embodiment of the present invention.
Figure 4B:
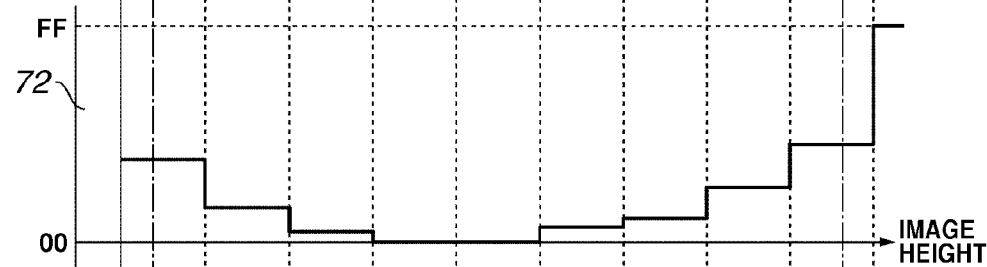
Figure 4C:
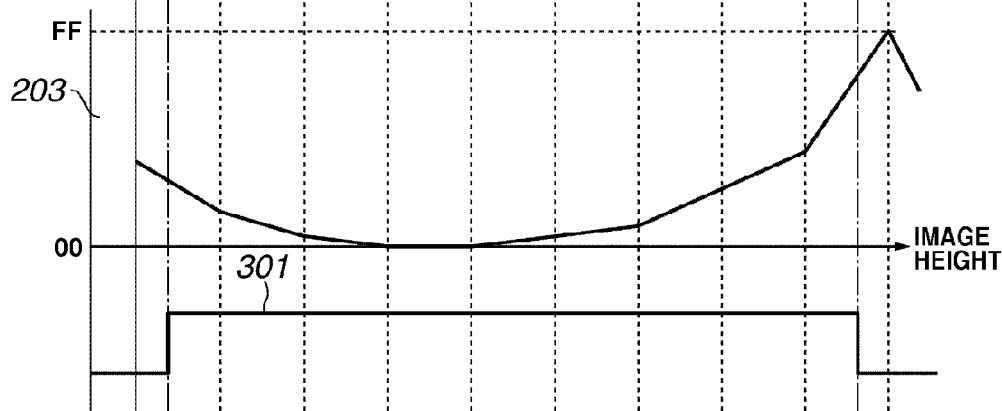
Figure 5:
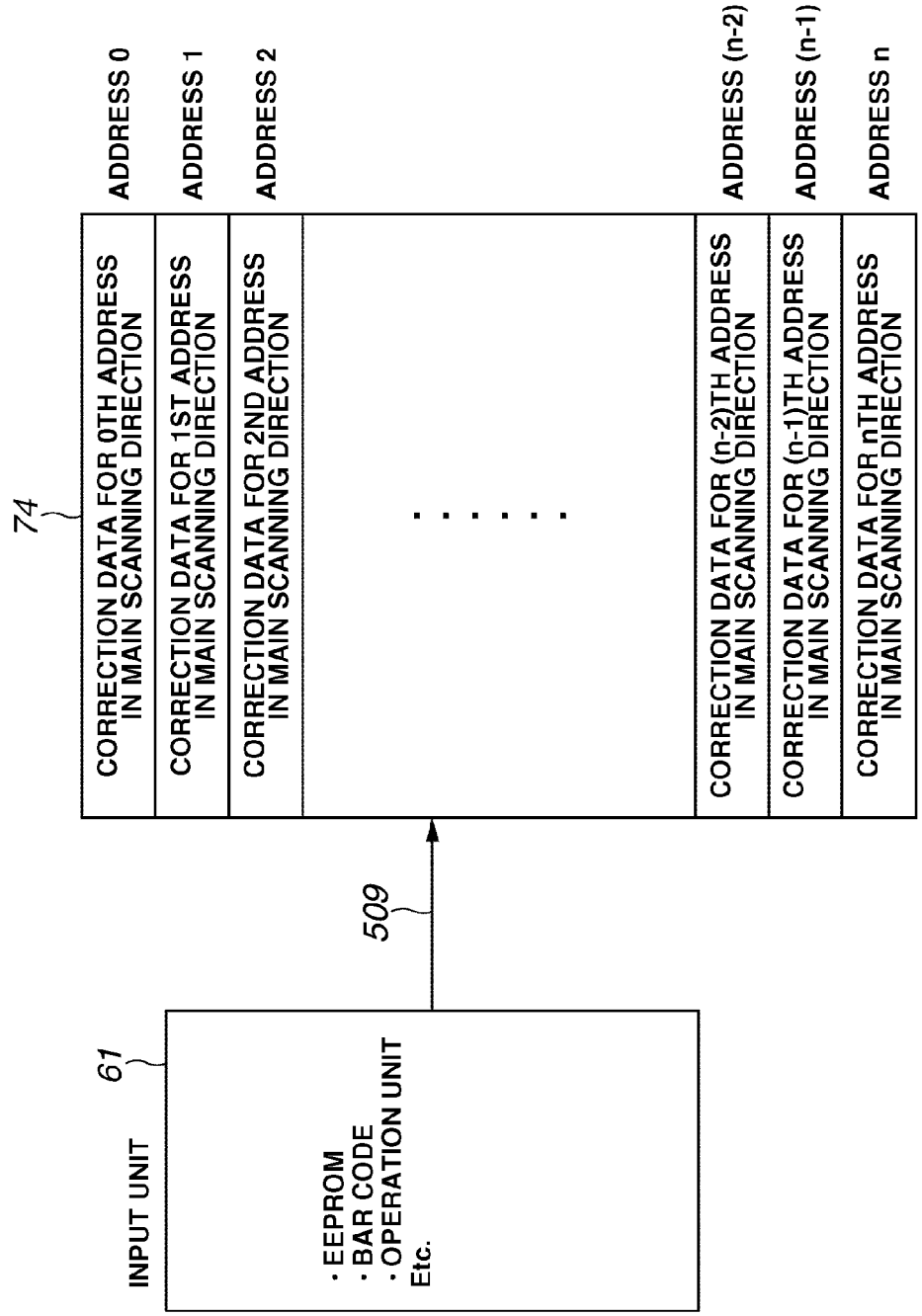
FIG. 5 illustrates correction data stored in a memory of the correction unit according to an exemplary embodiment of the present invention.

FIG. 5 illustrates correction data stored in the memory 74. The counter 75 is reset in response to the BD signal 201 and counts a pixel clock signal (CLK) synchronized with pixel data to be recorded. The counter 75 is, for example, a 4-bit counter, which generates an output (Q) 401, i.e., a carry signal, generated every time the counter 75 counts up to "16." The count number "16" of the counter 75 corresponds to the number of pixels in one correction block (i.e., a correction block between two neighboring dotted lines in FIG. 4) of each scanning line illustrated in FIG. 4, and can be used for reading correction data of each correction block (sample point).

The memory 74 stores the light quantity correction data 72 for the exposure control unit 10, which is received from the input unit 61 via a bus 509. The memory 74 is, for example, a first-in first-out (FIFO) memory and outputs correction data X of each correction block in synchronism with the output (Q) 401 of the counter 75 (i.e., every time the counter 75 counts up to "16"). Namely, as illustrated in FIG. 5, the memory 74 successively outputs the correction data X from address "0" to address "n" in the main scanning direction.

The latch unit 76 latches the correction data X received from the memory 74 in synchronism with the output (Q) 401 of the counter 75. The arithmetic processing unit 77 receives two input signals ADATA and BDATA, i.e., an output (W) of the latch unit 76 and an output (X) of the memory 74. Based on the two input signals ADATA and BDATA, the arithmetic processing unit 77 generates linearly interpolated data 203, which is output to the laser drive control unit 54. Namely, the arithmetic processing unit 77 performs a linear interpolation using the Nth correction data (BDATA) and the (N−1)th correction data (ADATA) in the main scanning direction.

Furthermore, the counter 75 outputs a count output 510 (i.e., a count value) to the comparator 505 and the comparator 506. The comparator 505 receives another input 501 representing a position (CLK number) from the BD signal 201 to a rise of the BD mask signal 301, which can be set by a central processing unit (CPU) (not illustrated) or a register (not illustrated). Similarly, the comparator 506 receives another input 502 representing a position (CLK number) from the BD signal 201 to a fall of the BD mask signal 301, which can be set by a CPU (not illustrated) or a register (not illustrated).

Referring to the count output 510 of the counter 75, the comparator 505 outputs a signal 503 having a high level at a rise position of the BD mask signal 301 and otherwise a low level. Similarly, the comparator 506 outputs a signal 504 having a high level at a fall position of the BD mask signal 301 and otherwise a low level. The comparator signal 503 is transmitted to a J terminal of the JK flip-flop 507. The comparator signal 504 is transmitted to a K terminal of the JK flip-flop 507. The JK flip-flop 507 is reset to a low level in response to the BD signal 201. The JK flip-flop 507 outputs the BD mask signal 301 to the laser drive control unit 54 when both the comparator signals 503 and 504 are at a high level.

An exemplary method for correcting light quantity falloff at edges by the above-described optical scanning apparatus is described below with reference to FIGS. 4A to 4C.

FIG. 4A illustrates optical characteristics 70 of the exposure control unit 10, which indicates a rate of light quantity falloff at edges in each block when the image height is divided into a plurality of blocks (sample points). According to the optical characteristics of FIG. 4A, the maximum rate of light quantity falloff at edges is 20%. In FIG. 4A, the ordinate axis represents the rate of light quantity falloff at edges and the abscissa axis represents the image height.

FIG. 4B illustrates an example of the correction data 72, which indicates correction data in each block for correcting the optical characteristics 70 illustrated in FIG. 4A. In FIG. 4B, FFH represents a correction level for a block where the rate of light quantity falloff at edges is maximum in the optical characteristics 70 (i.e., a block having a rate of light quantity falloff at edges of 20%, which is the n-th block in the main scanning direction), and 00H represents a correction level for a block where the rate of light quantity falloff at edges is minimum (i.e., a block having a rate of light quantity falloff at edges of 0%). FIG. 4B indicates correction data for light quantity falloff at edges in each block of the image height, which can be input from the input unit 61 to the correction unit 52.

FIG. 4C illustrates correction data 203 obtained by linearly interpolating the correction data 72 of two neighboring blocks, i.e., Nth correction data and (N−1)th correction data in the main scanning direction.

The correction unit 52 generates the BD mask signal 301 having a low level before and after the BD signal 201 is detected and otherwise having a high level. The correction unit 52 transmits the above-described linearly interpolated correction data 203 and the BD mask signal 301 to the laser drive control unit 54.

FIG. 5 illustrates correction data stored in the memory 74 of the correction unit 52. The memory 74 receives the correction data 72 from the input unit 61 via the bus 509 and stores the received correction data 72 as 0th to n-th correction data in order of address in the main scanning direction (correction data for a plurality of sample points). Namely, each correction data in the memory 74 is stored in relation to an allocated address. The correction unit 52 resets the counter 75 (i.e., internal address counter) in response to the BD signal 201, and successively outputs correction data from the address "0" to the address "n" in response to the CLK signal.

According to an exemplary embodiment, the memory 74 stores correction data received from the input unit 61. However, if the input unit 61 includes an EEPROM capable of functioning as the memory 74, the correction data can be directly read out of the EEPROM.

Figure 6:
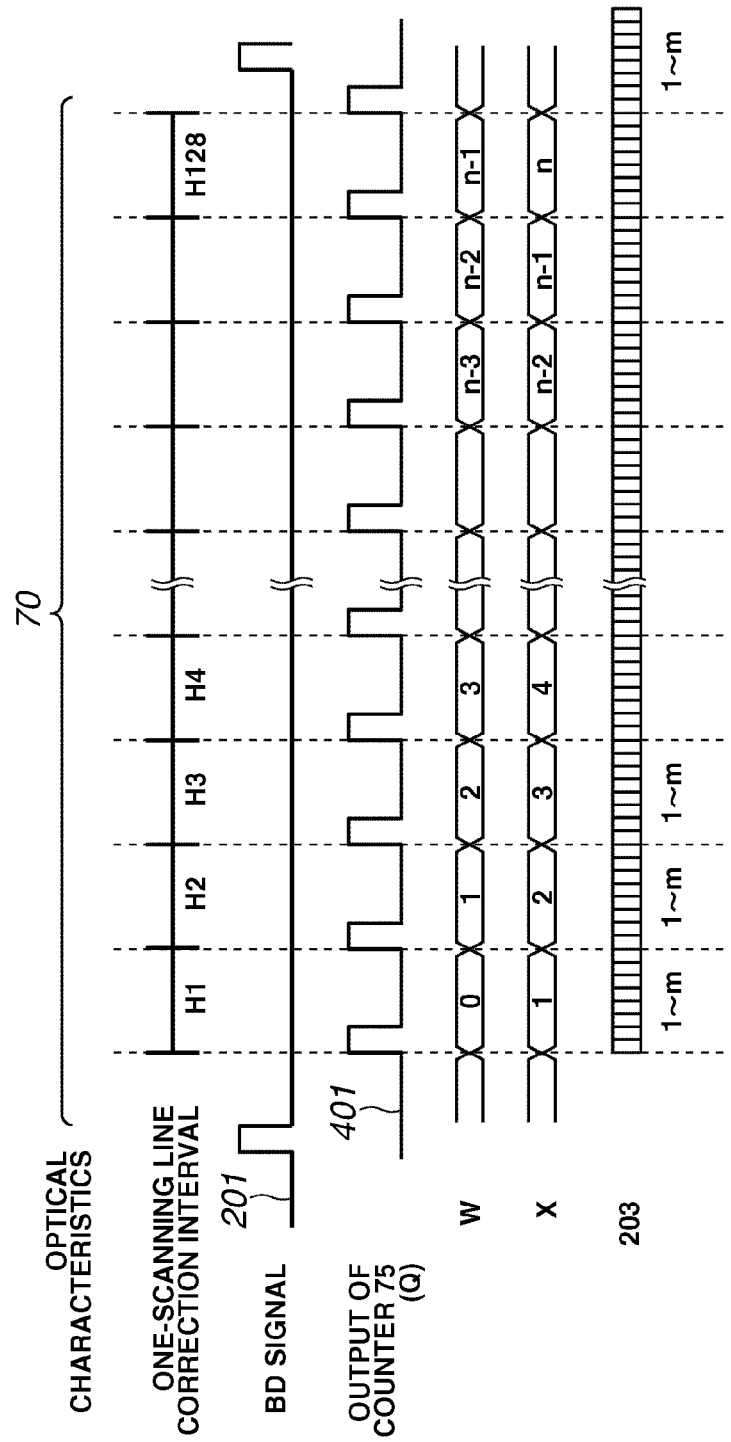
FIG. 6 illustrates generation of linearly interpolated data by the correction unit according to an exemplary embodiment of the present invention.

FIG. 6 illustrates generation of the linearly interpolated correction data 203 by the correction unit 52 illustrated in FIG. 3. In the present embodiment, one scanning line in the main scanning direction corresponds to 2048 pixels. One scanning line is divided into a total of 128 (n=127) correction blocks (H1 to H128). Each correction block corresponds to 16 pixels (m=16) (2048÷127=16).

The latch unit 76 illustrated in FIG. 3 generates an output W. The latch unit 76 latches data X output from the memory 74 in synchronism with the output (Q) 401 of the counter 75. The output (Q) 401 is a carry signal output from the counter 75 each time the counter 75 counts up to "16."

The memory 74 successively outputs the correction data X of each correction block in synchronism with the output (Q) 401 of the counter 75 (each time the counter 75 counts up to "16"), from the 0th correction data to the n-th correction data in the main scanning direction, as illustrated in FIG. 5.

The arithmetic processing unit 77 calculates the linearly interpolated correction data 203 based on two input signals ADATA and BDATA (i.e., the output (W) of the latch unit 76 and the output (X) of the memory 74) and outputs the linearly interpolated correction data 203 to the laser drive control unit 54. Namely, the arithmetic processing unit 77 performs a linear interpolation on the Nth correction data (BDATA) and the (N-1)th correction data (ADATA) and generates the linearly interpolated correction data 203.

Next, exemplary linear interpolation processing performed by the correction unit 52 is described below with reference to FIGS. 3, 5, and 6. Each correction block of one scanning line corresponds to 16 pixels (m=16). One scanning line corresponds to 2048 pixels. The number of pixels within a correction interval on one scanning line is "128" (n=127 in FIG. 5).

When the memory 74 receives the BD signal 201 from the BD sensor 36 via the reset terminal (RST), the memory 74 clears the address to "0." Similarly, when the counter 75 receives the BD signal 201 from the BD sensor 36 via the reset terminal (RST), the counter 75 clears the count value to "0." The counter 75 is a 4-bit counter. The output 401 of the counter 75 is a carry signal.

First, if a dummy clock signal (CLK) of 16 clocks is received for a correction block H1, the counter 75 outputs the output 401, which is a pulse signal of one clock. The latch unit 76 latches the output of the memory 74 (i.e., 0th correction data in the main scanning direction). The output of the memory 74 becomes first correction data in the main scanning direction, which is stored in the next address. Thus, the arithmetic processing unit 77 can receive the input ADATA (i.e., the 0th correction data (W) in the main scanning direction) from the latch unit 76 and the input BDATA (i.e., the first correction data (X) in the main scanning direction) from the memory 74.

The arithmetic processing unit 77 obtains a difference between two inputs W and X. The arithmetic processing unit 77 linearly interpolates the obtained difference with "16" corresponding to the number of pixels of one correction block, and outputs the linearly interpolated correction data 203 in synchronism with the pixel clock signal (CLK).

Namely, the arithmetic processing unit 77 performs linear interpolation processing on two correction data stored in neighboring addresses of the memory 74. The arithmetic processing unit 77 outputs new correction data 203 representing linearly interpolated correction data (1 to m in FIG. 6, where m=16).

After the correction processing for the correction block H1 is completed in this manner, the counter 75 outputs the pulse signal 401 to initiate correction processing for the next correction block H2. The latch unit 76 latches the output (W) of the memory 74 (i.e., first correction data in the main scanning direction). The output of the memory 74 becomes second correction data (X) in the main scanning direction, which is stored in the next address.

The arithmetic processing unit 77 obtains a difference between two inputs W and X. The arithmetic processing unit 77 linearly interpolates the obtained difference with "16" corresponding to the number of pixels within one correction interval, and outputs the linearly interpolated correction data 203 in synchronism with the pixel clock signal (CLK). Similarly, the arithmetic processing unit 77 outputs the linearly interpolated correction data 203 for each correction block (H3 to H128).

The memory 74 is an FIFO memory according to the example illustrated in FIG. 3. However, the memory 74 can be replaced with another type of memory. For example, the memory 74 can be an ordinary memory (RAM), which can receive a count value of the counter 75 as an address of the memory 74. In this case, according to the above-described example, the memory can include a 4-bit counter functioning as a first-stage counter and a second-stage counter that counts a carry output of the 4-bit counter. An output of the second-stage counter can be used as an address of the memory 74.

Furthermore, according to the above-described example, the memory 74 has a memory space of 1028 addresses. The 0th correction data in the main scanning direction is stored in a memory space ranging from address 0 to address 15 in the memory 74. The first correction data in the main scanning direction is stored in a memory space ranging from address 16 to address 31 in the memory 74. The second correction data in the main scanning direction is stored in a memory space ranging from address 32 to address 47 in the memory 74. One counter and the memory 74 can realize an operation similar to the operation realized by the counter 75 and the memory 74 illustrated in FIG. 3.

Figure 7:
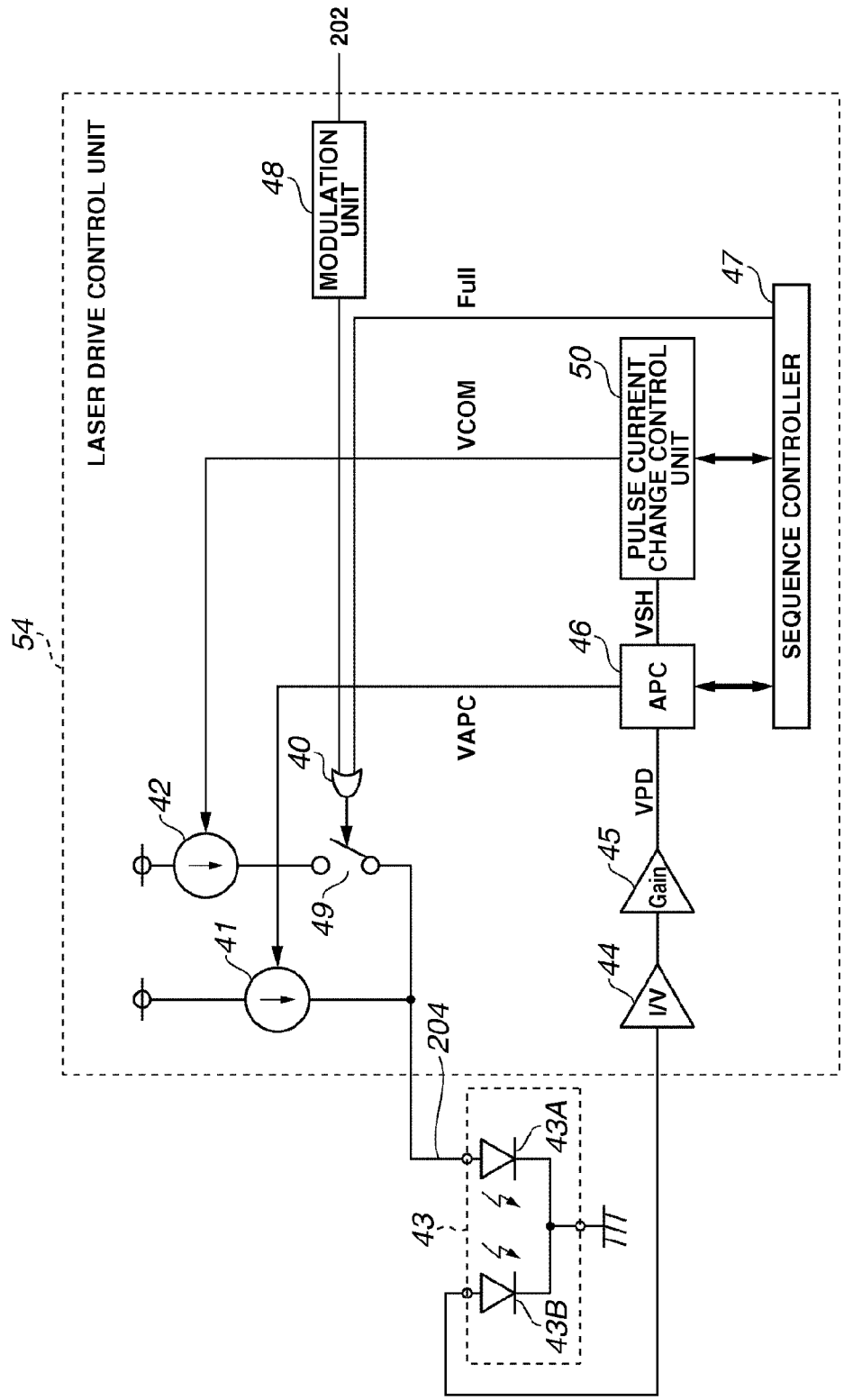
FIG. 7 illustrates a laser drive control unit according to an exemplary embodiment of the present invention.

FIG. 7 illustrates an example of the laser drive control unit 54 in the exposure control unit 10 according to an exemplary embodiment.

The semiconductor laser 43 includes a laser diode 43A and a PD sensor 43B. A bias current source 41 supplies bias current to the laser diode 43A. A pulse current source 42 supplies pulse current to the laser diode 43A. A modulation unit 48 performs pixel modulation processing on the image signal 202 received from the image signal generation unit 53. A switch 49 turns on or off according to a signal from a logic element 40 that obtains a logical sum of the modulation signal and a full-lighting signal FULL (i.e., a BD detection signal) supplied from a sequence controller 47.

When the switch 49 is in an ON state, the laser diode 43A emits light having an intensity corresponding to a sum of the current supplied from the bias current source 41 and the current supplied from the pulse current source 42. The current supplied from the bias current source 41 is stationary during one scanning operation. The current supplied from the pulse current source 42 is variable during one scanning operation. When the switch 49 is in an OFF state, the laser diode 43A emits light having an intensity corresponding to only the current supplied from the bias current source 41.

The PD sensor 43B monitors the quantity of light during a full-lighting operation for the BD detection (i.e., when the full-lighting signal FULL is in an active stare). A current/voltage (I/V) converter 44 converts an output signal from the PD sensor 43B into a voltage signal. An amplifier 45 amplifies an output signal from the converter 44. An APC circuit 46 receives a signal VPD representing an output signal from the amplifier 45.

The APC circuit 46 samples the signal VPD in response to a sample-and-hold signal supplied from the sequence controller 47 during a BD detection period. The APC circuit 46 holds the sampled signal during one scanning operation and outputs the sampled-and-held signal as a VSH signal to a pulse current change control unit 50. At the same time, the APC circuit 46 compares the VSH signal with a predetermined voltage value corresponding to a maximum light quantity and generates a difference signal VAPC to control the bias current of the bias current source 41.

The pulse current change control unit 50 receives the VSH signal from the APC circuit 46, and also receives correction data, a target light quantity setting value, and a maximum rate of light quantity falloff at edges from the sequence controller 47. The pulse current change control unit 50 outputs a signal VCOM to control the pulse current of the pulse current source 42.

Figure 8:
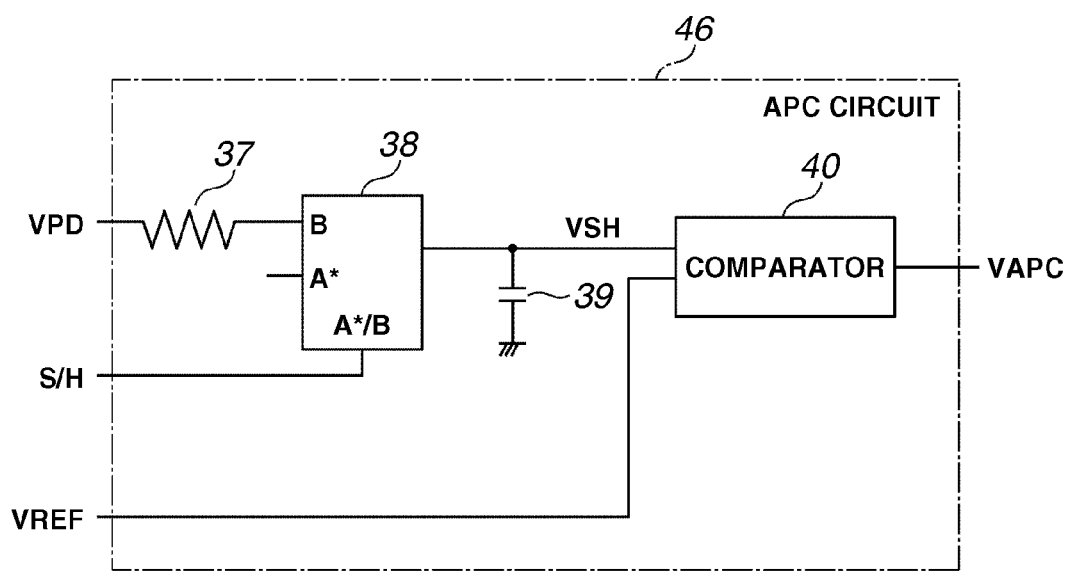
FIG. 8 illustrates an APC circuit in the laser drive control unit according to an exemplary embodiment of the present invention.

FIG. 8 is a circuit diagram illustrating an example of the APC circuit 46 according to an exemplary embodiment. The APC circuit 46 includes an analog switch 38 that samples an amplified PD sensor output VPD in response to a sample-and-hold signal S/H supplied from the sequence controller 47. The analog switch 38 holds a sampled voltage value VSH during one scanning operation at a time constant determined by a resistor 37 and a capacitor 39.

A comparator 40 compares the voltage value VSH with a predetermined value VREF. The comparator 40 outputs the difference signal VAPC to control the current of the bias current source 41. Namely, the APC circuit 46 controls the current of the bias current source 41 in each scanning operation such that a bias light-emission value becomes equal to a target value being set by the predetermined value VREF. Thus, the APC circuit 46 can equalize the bias light quantity of the laser diode 43A with a desired light quantity.

The image forming apparatus according to an exemplary embodiment performs light quantity correction during one scanning operation, in addition to the above-described APC processing. The pulse current change control unit 50 generates a signal VCOM to control a pulse current amount of the pulse current source 42 during one scanning operation.

Figure 9:
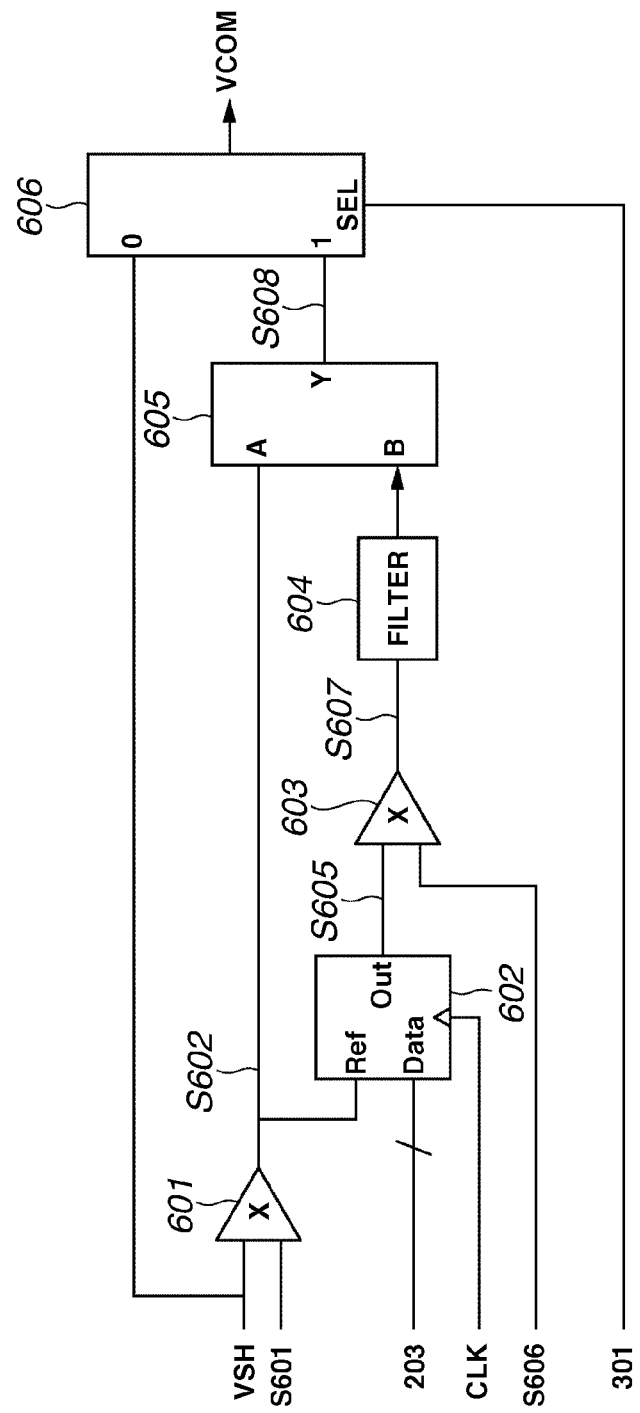
FIG. 9 illustrates a pulse current change control unit in the laser drive control unit according to an exemplary embodiment of the present invention.

FIG. 9 is a circuit diagram illustrating an exemplary configuration of the pulse current change control unit 50 according to an exemplary embodiment.

The pulse current change control unit 50 includes a multiplier 601 (e.g., an operational amplifier). The multiplier 601 multiples the voltage value VSH (sampled-and-held voltage signal) received from the APC circuit 46 by a target light quantity setting value S601 (i.e., a value equal to or less than "1") supplied from a CPU (not illustrated), and generates an output voltage S602 representing a multiplied value. The pulse current change control unit 50 includes a D/A converter 602 that receives the output voltage S602 from the multiplier 601 as a reference voltage. The D/A converter 602 performs D/A conversion processing on the output voltage S602 based on the linearly interpolated correction data 203 supplied from the correction unit 52 and the clock signal CLK and generates an output voltage S605.

Furthermore, the pulse current change control unit 50 includes a multiplier 603 (e.g., an operational amplifier). The multiplier 603 multiplies the output voltage S605 supplied from the D/A converter 602 by a maximum rate of light quantity falloff at edges S606 supplied from the sequence controller 47, and generates an output voltage S607 representing a multiplied value.

According to an exemplary embodiment, the maximum rate of light quantity falloff at edges S606 is 20%. Thus, the constant multiplied by the multiplier 603 is 0.2 (i.e., a value smaller than 21" and corresponds to a maximum rate for realizing the light quantity correction). A low-pass filter 604 is, for example, composed of a capacitor and a resistor. An adder 605 is an operational amplifier that generates an output voltage S608 representing an addition of the output voltage of the low-pass filter 604 and the output voltage S602 of the multiplier 601. An analog switch 606 selectively outputs the voltage value VSH or the output voltage S608 (i.e., a signal filtered by the low-pass filter 604 and offset by the adder 605) according to the BD mask signal 301. If the maximum rate of light quantity falloff at edges S606 is 30%, the constant multiplied by the multiplier 603 is 0.3. If the maximum rate of light quantity falloff at edges S606 is 50%, the constant multiplied by the multiplier 603 is 0.5. A VCOM signal is output from the analog switch 606.

Figure 10A:
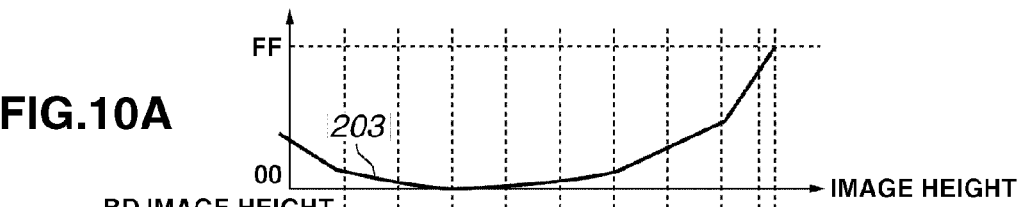
FIGS. 10A to 10E illustrate an operation of the pulse current change control unit in the laser drive control unit according to an exemplary embodiment of the present invention.
Figure 10B:
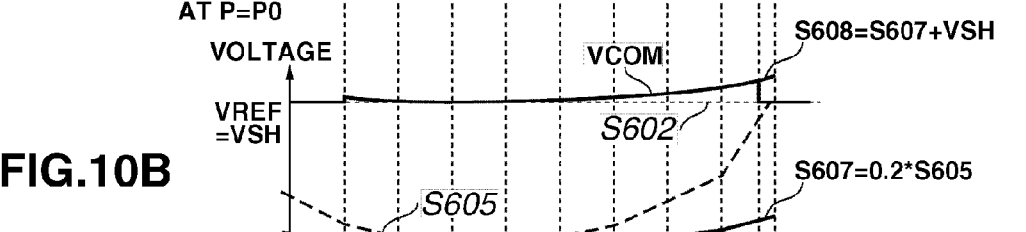

FIGS. 10A to 10E illustrate an exemplary flow of signals in the pulse current change control unit 50 illustrated in FIG. 9. FIG. 10A illustrates linear interpolation correction data corresponding to each block image height illustrated in FIG. 4C. FIG. 10B illustrates an exemplary case where the target light quantity setting value S601 is "1" (e.g., the target light quantity is 100%).

In FIG. 10B, as the target light quantity setting value S601 is "1", the output voltage S602 of the multiplier 601 is equal to the sampled-and-held voltage VSH obtained in the APC processing. The D/A converter 602 receives the sampled-and-held voltage VSH (i.e., the reference voltage for the D/A conversion) from the multiplier 601 and also receives the linearly interpolated correction data 203. The D/A converter 602 performs the D/A conversion processing on the input data such that the sampled-and-held voltage VSH can be output when the correction data 203 is FFH.

The multiplier 603 receives the analog converted voltage S605 from the D/A converter 602 and the maximum rate of light quantity falloff at edges S606 (i.e., 20%=0.2 in this example) from the sequence controller 47. The multiplier 603 multiples the voltage S605 by 0.2 and generates the output signal S607. The adder 605 receives the output signal S607 (=0.2×S605) via the low-pass filter 604 and generates the voltage S608, which is offset by an amount equivalent to the voltage VSH. The analog switch 606 receives the output voltage S608 from the adder 605.

The analog switch 606 selects an output voltage (i.e., a light quantity signal for obtaining a main scanning synchronizing signal in each scanning operation) according to the BD mask signal 301. More specifically, the analog switch 606 outputs the voltage S608 in an image region such that an ordinary APC operation can be carried out during a BD period. The analog switch 606 outputs the voltage VSH in a non-image region. The pulse current source 42 is controlled according to a VCOM signal output from the analog switch 606.

Figure 10C:
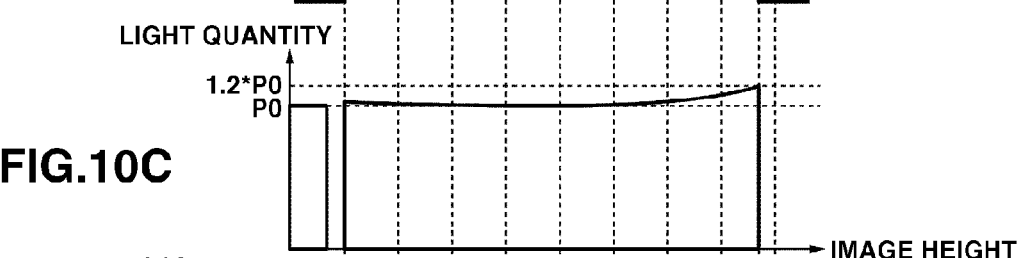

FIG. 10C illustrates the quantity of light emitted from the laser 43 according to the current of the pulse current source 42. The light quantity on the drum surface becomes a flat light quantity of P0. Namely, the pulse current change control unit 50 applies the D/A conversion to a rate of light quantity falloff at edges of 20% in a full-range. Thus, the correction resolution (1LSB of D/A) is 0.078% (=20%/256), which is excellent compared to 0.39% (=100%/256) according to a conventional example.

Figure 10D:
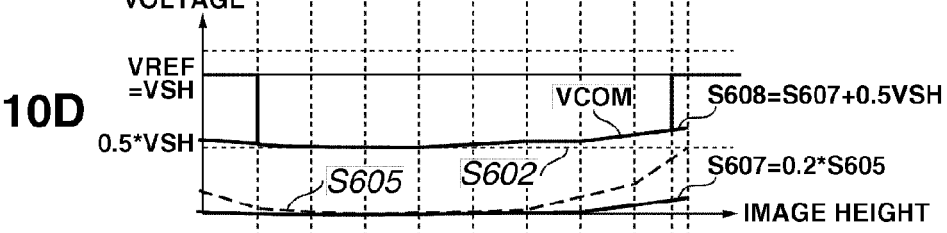

FIG. 10D illustrates an exemplary case where the target light quantity is reduced to a half level. In this case, the target light quantity setting value S601 received from the sequence controller 47 is 0.5. Thus, the multiplier 601 generates the output voltage S602 (=0.5×VSH) as illustrated in FIG. 10D. The D/A converter 602 receives the voltage S602 (i.e., the reference voltage) from the multiplier 601 and also receives the linearly interpolated correction data 203.

The D/A converter 602 performs the D/A conversion processing on the input data such that the voltage 0.5VSH can be output when the correction data 203 is FFH. The multiplier 603 receives the analog converted voltage S605 from the D/A converter 602 and the maximum rate of light quantity falloff at edges S606 (i.e., 20%=0.2 in this example) from the sequence controller 47. The multiplier 603 multiples the voltage S605 by 0.2 and generates the output signal S607.

The adder 605 receives the output signal S607 (=0.2× S605) via the low-pass filter 604 and generates the voltage S608, which is offset by an amount equivalent to the voltage 0.5VSH. The analog switch 606 receives the voltage S608 from the adder 605. The analog switch 606 selects an output voltage according to the BD mask signal 301. More specifically, the analog switch 606 outputs the voltage S608 in an image region such that an ordinary APC operation can be carried out during a BD period. The analog switch 606 outputs the voltage VSH in a non-image region. The pulse current source 42 is controlled according to the VCOM signal output from the analog switch 606.

Figure 10E:
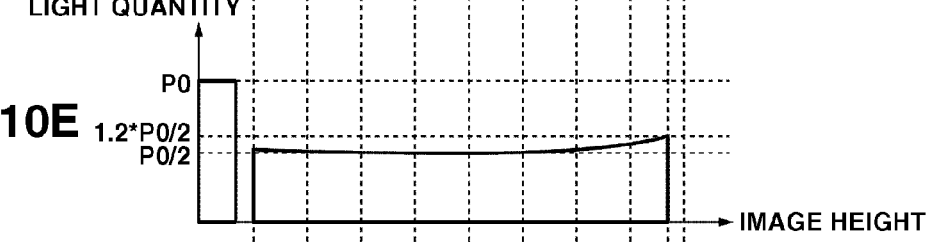
Figure 11A:
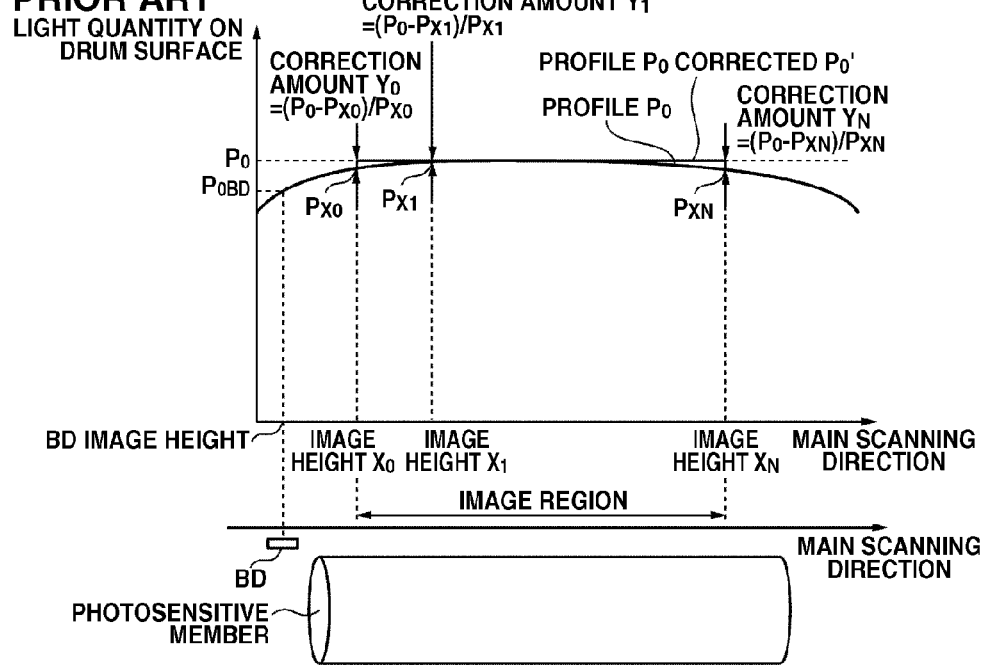
FIG. 11A illustrates a profile in a conventional example in which the light quantity of a laser is not changed.
Figure 11B:
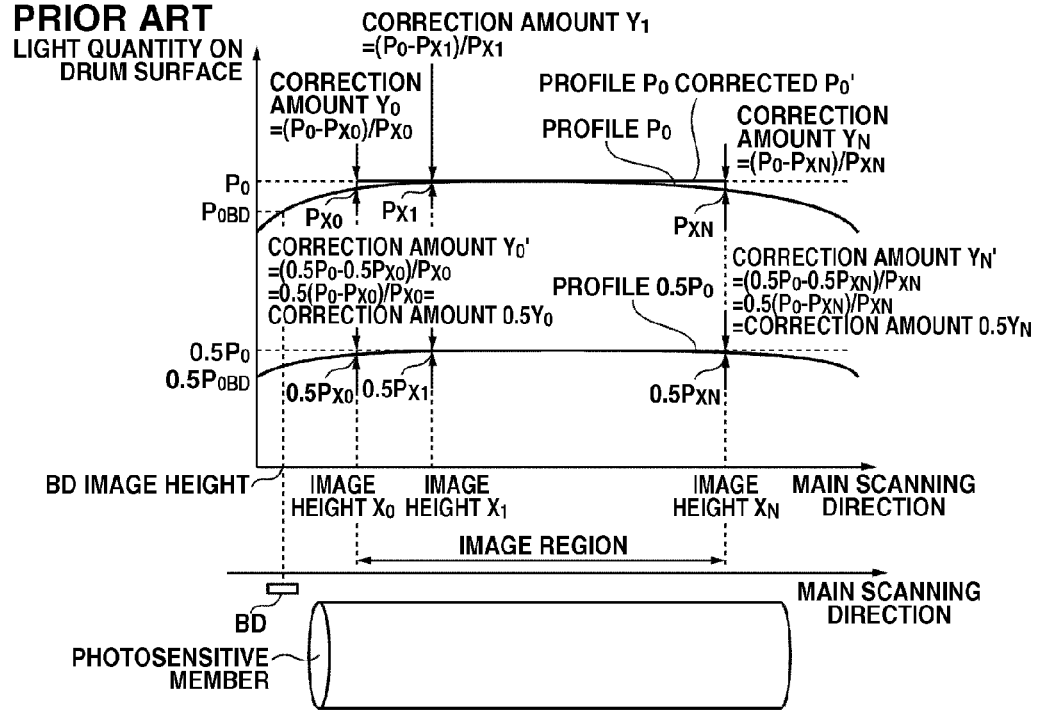
FIG. 11B illustrates a profile in a conventional example in which the light quantity of a laser is changed.
Figure 12:
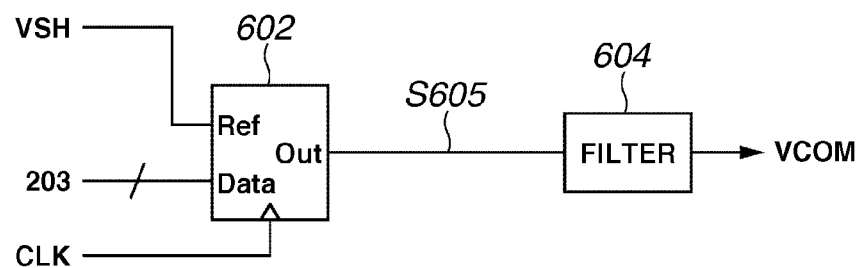
FIG. 12 illustrates an example of a conventional correction circuit for correcting light quantity falloff at edges.

FIG. 10E illustrates the quantity of light emitted from the laser 43 according to the current of the pulse current source 42. The light quantity during a BD period is P0. The light quantity on the drum surface becomes a flat light quantity of P0/2. Namely, the light quantity during a BD period is unchanged even if the target light quantity is reduced to a half value. The BD synchronization accuracy does not deteriorate. The light quantity correction data can be used without any change. Therefore, it is unnecessary to re-calculate the correction data every time the target light quantity is changed.

Namely, the pulse current change control unit 50 applies the D/A conversion to a maximum rate of light quantity falloff at edges of 20% in a full-range of 00H to FFH. Thus, the correction resolution (1LSB of D/A) is 0.078% (=20%/256), which is excellent compared to 0.39% (=100%/256) according to a conventional example.

As described above, an exemplary embodiment can improve the correction resolution by multiplying a maximum rate of light quantity falloff at edges by the light quantity correction data subjected to the D/A conversion processing. Thus, light quantity correction data of a full-range (corresponding to a maximum rate of light quantity falloff at edges) can be input to the D/A converter.

Furthermore, an exemplary embodiment is configured to switch between a light quantity in a BD detection operation and a target light quantity for correcting light quantity falloff at edges, so that the D/A reference voltage can be changed according to the target light quantity. Thus, the BD synchronization accuracy does not deteriorate. An exemplary embodiment does not require a re-calculation of light correction data even if the target light quantity is changed. Thus, the load of a CPU can be reduced.

Furthermore, an exemplary embodiment corrects light quantity falloff at edges (including only one peak in the light quantity distribution) in the optical characteristics of an optical scanning apparatus. However, if the sensitivity of a drum has a plurality of peaks depending on the image height, a similar control operation can be performed to correct the unevenness although different light quantity correction data is used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus comprising:
    a photosensitive member;
    a light source configured to emit a laser beam used for exposing the photosensitive member based on a driving current;
    a deflection unit configured to deflect the laser beam so that the photosensitive member is scanned with the laser beam;
    an optical member configured to guide the laser beam deflected by the deflection unit onto the photosensitive member;
    a setting unit configured to set a reference voltage at which the light source emits the laser beam;
    an output unit configured to output correction data for correcting a light quantity of the laser beam according to an exposure position of the laser beam guided onto the photosensitive member by the optical member in a scanning direction in which the photosensitive member is scanned with the laser beam;
    a generation unit configured to generate an analog signal of a voltage based on the reference voltage and the correction data;
    a correction unit configured to correct the voltage of the analog signal based on a predetermined correction value set based on optical characteristics of the optical member wherein the correction unit multiplies the voltage of the analog signal generated by the generation unit by the predetermined correction value so as to correct the voltage of the analog signal; and
    a driving unit configured to supply, to the light source, the driving current of a value based on the voltage of the analog signal corrected by the correction unit and the reference voltage set by the setting unit.

2. The image forming apparatus according to claim 1, further comprising:
    a light-receiving unit configured to receive the laser beam deflected by the deflection unit,
    wherein the driving unit supplies the driving current to the light source based on a light-receiving time when the light-receiving unit receives the laser beam and input image data,
    wherein the driving unit includes a selection unit configured to select one of a first mode in which the driving unit supplies the driving current of a value based on the voltage of the analog signal to the light source and a second mode in which the driving unit supplies the driving current of a value based on the reference voltage to the light source, and
    wherein the selection unit selects the second mode when the receiving unit receives the laser beam.

3. The image forming apparatus according to claim 1, wherein the predetermined correction value is set based on an amount of change in the light quantity of the laser beam in the scanning direction.

4. The image forming apparatus according to claim 1, wherein the predetermined correction value is set based on a difference between a maximum light quantity and a minimum light quantity of the laser beam guided onto the photosensitive member by the optical member in a case where the photosensitive member is scanned with the laser beam emitted from the light source to which a driving current of a constant value is supplied.

5. The image forming apparatus according to claim 4, wherein the predetermined correction value is a constant smaller than 1 regardless of a position of the scanning direction.

6. The image forming apparatus according to claim 1,
    wherein the setting unit includes a detection unit configured to detect the laser beam emitted from the light source, and
    wherein the setting unit sets the reference voltage according to a light quantity of a laser beam detected by the detection unit.

7. The image forming apparatus according to claim 1, wherein the output unit includes a storage unit configured to store a plurality of correction data corresponding to a plurality of exposure positions of the laser beam guided onto the photosensitive member, and outputs correction data corresponding to an exposure position of the laser beam from the storage unit.

8. A control apparatus disposed in an image forming apparatus comprising a light source configured to emit a laser beam used for exposing a photosensitive member disposed in the image forming apparatus, a deflection unit configured to deflect the laser beam so that the photosensitive member is scanned with the laser beam and an optical member configured to guide the laser beam deflected by the deflection unit onto the photosensitive member, and configured to control a driving current to be supplied to the light source so that the light source emits the laser beam, the control apparatus comprising:
    a setting unit configured to set a reference voltage at which the light source emits the laser beam;
    an output unit configured to output correction data for correcting a light quantity of the laser beam according to an exposure position of the laser beam guided onto the photosensitive member by the optical member in a scanning direction in which the photosensitive member is scanned with the laser beam;

a generation unit configured to generate an analog signal of a voltage based on the reference voltage and the correction data;

a correction unit configured to correct the voltage of the analog signal based on a predetermined correction value set based on optical characteristics of the optical member wherein the correction unit multiplies the voltage of the analog signal generated by the generation unit by the predetermined correction value so as to correct the voltage of the analog signal; and a driving unit configured to supply, to the light source, the driving current of a value based on the voltage of the analog signal corrected by the correction unit and the reference voltage set by the setting unit.

9. The control apparatus according to claim 8,
wherein the image forming apparatus includes a light-receiving unit configured to receive the laser beam deflected by the deflection unit,
wherein the driving unit supplies the driving current to the light source based on a light-receiving time when the light-receiving unit receives the laser beam and input image data,
wherein the driving unit includes a selection unit configured to select one of a first mode in which the driving unit supplies the driving current of a value based on the voltage of the analog signal to the light source and a second mode in which the driving unit supplies the driving current of a value based on the reference voltage to the light source, and
wherein the selection unit selects the second mode when the receiving unit receives the laser beam.

10. The control apparatus according to claim 8, wherein the predetermined correction value is set based on an amount of change in the light quantity of the laser beam in the scanning direction.

11. The control apparatus according to claim 8, wherein the predetermined correction value is set based on a difference between a maximum light quantity and a minimum light quantity of the laser beam guided onto the photosensitive member by the optical member in a case where the photosensitive member is scanned with the laser beam emitted from the light source to which a driving current of a constant value is supplied.

12. The control apparatus according to claim 11, wherein the predetermined correction value is a constant smaller than 1 regardless of a position of the scanning direction.

13. The control apparatus according to claim 8,
wherein the setting unit includes a detection unit configured to detect the laser beam emitted from the light source, and
wherein the setting unit sets the reference voltage according to a light quantity of a laser beam detected by the detection unit.

14. The control apparatus according to claim 8, wherein the output unit includes a storage unit configured to store a plurality of correction data corresponding to a plurality of exposure positions of the laser beam guided onto the photosensitive member, and outputs correction data corresponding to an exposure position of the laser beam from the storage unit.

* * * * *